United States Patent [19]

Flasck

[11] Patent Number: 5,024,524
[45] Date of Patent: Jun. 18, 1991

[54] REFLECTIVE IMAGE PLANE MODULE

[75] Inventor: Richard A. Flasck, San Ramon, Calif.

[73] Assignee: RAF Electronics Corp., San Ramon, Calif.

[21] Appl. No.: 392,747

[22] Filed: Aug. 11, 1989

[51] Int. Cl.⁵ .................. G03B 21/00; G09G 3/36
[52] U.S. Cl. ...................................... 353/31; 350/334; 353/33; 353/81
[58] Field of Search .................. 353/30, 31, 32, 33, 353/34, 82, 122, 81, 84, 94, 37; 350/96.15, 96.18, 96.19, 96.2, 286, 333, 339 F

[56] References Cited

U.S. PATENT DOCUMENTS

| | | | |
|---|---|---|---|
| 3,525,566 | 8/1970 | Altman | 353/66 |
| 3,862,360 | 1/1975 | Dill et al. | 178/7.3 D |
| 4,103,297 | 7/1978 | McGreivy et al. | 340/324 M |
| 4,239,346 | 12/1980 | Lloyd | 350/334 |
| 4,368,963 | 1/1983 | Stolov | 353/31 |
| 4,582,395 | 4/1986 | Morozumi | 350/333 |
| 4,716,403 | 12/1987 | Morozumi | 350/339 F |
| 4,749,259 | 6/1988 | Ledebuhr | 353/33 |
| 4,826,311 | 5/1989 | Ledebuhr | 353/33 |
| 4,838,654 | 6/1989 | Hamaguchi et al. | 350/333 |

Primary Examiner—William A. Cuchlinski, Jr.
Assistant Examiner—William C. Dowling
Attorney, Agent, or Firm—Leydig, Voit & Mayer

[57] ABSTRACT

A reflective image plane module including light directing and reflecting structures and a wafer based active matrix mated thereto. A source of light is directed to the reflective image plane module wherein the wafer based active matrix imparts or encodes information onto a light beam reflected therefrom. The reflective image plane module projects the reflected beam for imaging or viewing, such as through one or more lens. The reflective image plane module includes a prism or mirror which passes the light or light component through a first surface to the wafer based active matrix mated to a second surface and which projects the reflected light from the first surface to be viewed or imaged.

The wafer based active matrix includes a specular reflective back surface and an LC or similar type material formed thereon which is electronically altered to impart the information to the light beam reflected therefrom.

The reflective image plane module can be utilized in various light encoding systems such as a monochrome projector including a single reflective image plane module or a full color system including three reflective image plane modules, one for each color, which then are combined on a screen or before projecting on the screem to form the full color projection image.

33 Claims, 5 Drawing Sheets

REFLECTIVE IMAGE PLANE MODULE

BACKGROUND OF THE INVENTION

The invention relates generally to light encoding systems and more particularly to an active matrix reflective encoding system.

During the last two decades, there have been numerous efforts to develop and commercialize light encoding systems such as flat panel displays to effectively compete with the conventional cathode ray tube (CRT) or to develop products which are not possible utilizing CRT's. Of these efforts, plasma display panels (PDP), electroluminescent displays (EL) and several types of liquid crystal displays (LCD) have clearly been the most successful and have exhibited the most dynamic growth and future potential. One specific type of display, active matrix liquid crystal displays (AMLCD), has demonstrated sufficient performance to address some major market segments.

The cost of AMLCD's is largely determined by the yield of useable devices, where the yield is the percentage of useable devices from the total produced. Yield of AMLCD's is in large part determined by the device design, manufacturing process tolerance and the display size. In general, the larger the display size, the lower the yield and hence higher the cost of the device.

The focus of efforts in recent years has been in developing direct view display sizes large enough to replace existing TV and computer monitors. Pocket TV's have been introduced having one to three inch wide display screens, with the expressed goal of producing larger displays as volume and yield increase. An intense effort is being made to produce a fourteen inch diagonal or larger display. The ultimate goal of some efforts is to produce wall size direct view displays for the TV market. This goal is very likely to be frustrated by the inherent obstacles in producing a CRT or any other type of direct view display of that size.

The AMLCD effort has concentrated on utilizing a matrix of nonlinear devices on a glass or fused silica substrate. The nonlinear devices allow individual control over each display picture element or "pixel" to provide superior optimal performance. The nonlinear devices generally are amorphous or polycrystalline silicon thin film transistors (TFT); however, thin film diodes (TFD) and metal-insulator-metal (MIM) devices also have been employed.

A transparent substrate is considered necessary for these displays, because most liquid crystal (LC) materials require a polarizer at both the front and the back of the LCD device. Further, the conventional position on color displays is that they must be transmissive rather than reflective, because of the light losses inherent in the color reflective mode.

In developing larger size displays, substrate cost becomes important. Amorphous silicon TFT AMLCD's utilize inexpensive drawn glass. Polycrystalline silicon on the other hand, requires either very high temperature glass or fused silica substrates. Either of these substrates is prohibitively expensive in widths over eight inches. The inexpensive amorphous silicon AMLCD substrates are offset by the fact that these displays require separate address devices which result in several hundred interconnections to the display substrate. Polycrystalline silicon AMLCD's allow integration of the addressing circuitry on the substrate which reduces the number of interconnections to a very few.

The first direct view AMLCD utilizing a single crystal silicon wafer was produced in the early 1970's. Work on this development continued into the early 1980's, utilizing standard crystal silicon wafers and wafer fabrication techniques. This work appears to virtually have been abandoned since the display sizes are limited to less than the available wafer size and because the wafers are not transparent. These devices utilized dynamic scattering guest-host or dyed phase change rather than conventional twisted nematic LC material, which required expensive and elaborate photolithography to produce the required diffuse reflective aluminum back surface. These devices do provide fast, high performance and stable displays with integrated address and drive circuitry.

New markets have been recognized which include home theatre high definition TV, audio visual machines and high resolution large area computer aided design (CAD) stations. Each of these markets require very large, high resolution, full color and video speed imaging. In reviewing these markets Applicant has determined that the large area dictates projection systems, either front or rear projection, that the high resolution requires integrated drivers and that projection systems do not require either transparent substrates or large display sizes. Further, these markets all essentially utilize what can be considered light encoding devices. Other types of light encoding devices include wafer or printed circuit board mask sets.

It, therefore, would be desirable to provide an active matrix reflective light encoding system having high resolution, integrated drivers and manufactured with conventional wafer fabrication techniques.

SUMMARY OF INVENTION

The disadvantages of the prior art light encoding systems and techniques are overcome in accordance with the present invention by providing an active matrix reflective light encoding system utilizing a conventional wafer.

The active matrix reflective light encoding system includes a reflective image plane module. The reflective image plane module includes a wafer based active matrix mated to a light directing and projecting structure. A source of light is directed to the reflective image plane module wherein the wafer based active matrix imparts or encodes information onto a light beam reflected therefrom. The reflective image plane module light projecting structure projects the reflected beam for viewing or imaging, such as through one or more lens.

The wafer based active matrix includes a specular reflective back surface and an LC or similar characteristic material formed thereon which is electronically altered to impart or encode the information to the light beam reflected therefrom. The LC material preferably is a solid light modulating material having bodies of LC material suspended in the solid material.

The reflective image plane module light directing and projecting structure is formed from a prism or mirror which passes the light or light component through a first surface to the wafer based active matrix mated to a second surface and which projects the reflected light from the first surface to be viewed or imaged.

DESCRIPTION OF THE PREFERRED EMBODIMENTS

Figure 1:
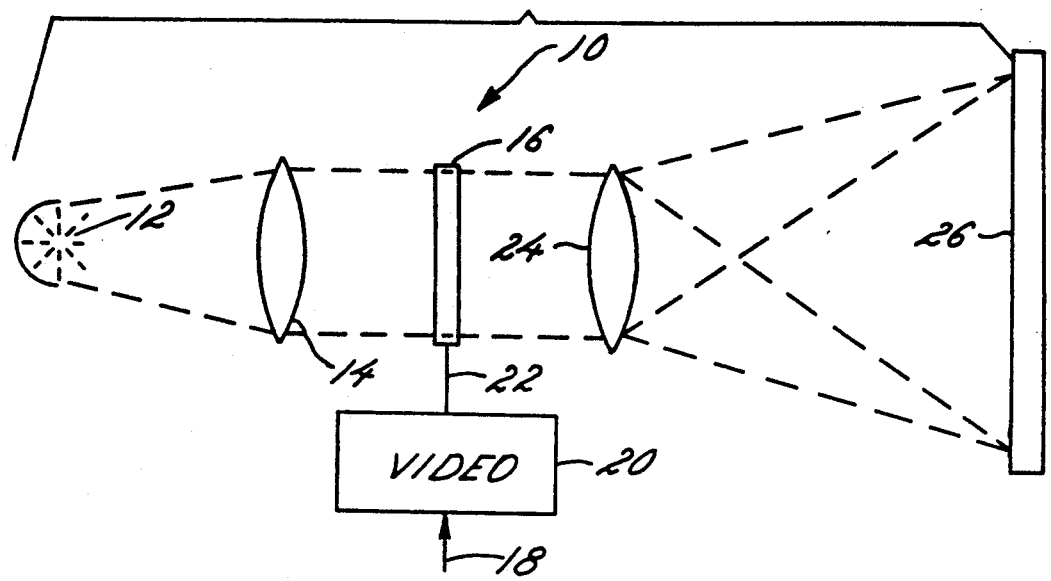
FIG. 1 is a diagrammatic view of a prior art light encoding transmissive projector system.

One major utilization of light encoding devices is light encoding projector systems. The light encoding reflective image plane module of the present invention is not limited to utilization in such systems; however, projector systems will be described for example purposes. Referring to FIG. 1, a prior light art light encoding transmissive projection system 10 is illustrated. A light source 12 provides light to a lens or lens system 14, which directs the light to a transmissive LCD 16. A video or computer signal source (not illustrated) is coupled by a line 18 to a video drive circuit 20. The video drive circuit 20 operates on the signal coupled thereto and generates the required drive signals coupled over a line 22 to the LCD 16. Typically the drive signals will be the audio, red video, blue video, green video, vertical sync, horizontal sync, reset and pixel clock signals. The drive signals cause the pixels of the LCD 16 to block or transmit light to impart or encode the required information onto the light transmitted through the LCD 16 to a lens or lens system 24 which projects the composite color picture onto the screen 26. A monochrome projection system would operate in the same manner with only one video light component, rather than the separate blue, green and red video signals.

One prior art transmissive projection system has been developed by Seiko Epson Corp. and utilizes three separate LCD panels, one for each of the blue, green and red video signals. The signals then are combined by a dichroic prism prior to projecting onto the screen. These transmissive projection systems suffer from a number of problems. One significant problem is caused by the construction required by the LC material. The LCD panels include a polarizer on each side of the LC material, such as twisted nematic material, and are utilized as a shutter to absorb the light not to be transmitted. Both the polarizers and the LC material absorb light which generates heat, which is deleterious to the LCD panel. Further, because of the two polarizers, and the LC material utilized, only about fifteen per cent or less of the light directed to the LCD panel is transmitted therethrough for projection to the screen. The devices exhibit low brightness, because of the amount of light absorbed.

Further, the resolution of the transmissive panels, typically based upon amorphous silicon deposited active matrix devices, is not as great as that which could be achieved if crystalline based technology was utilized. The pixel density can be made greater by placing the pixel drain pads centered over row and column lines in crystalline devices. Amorphous silicon devices have to leave spaces between pixels for the row and column lines and hence cannot be packed as densely without seriously decreasing the yield.

As mentioned above, deposited amorphous silicon devices have a much greater number of LCD panel interconnects. This decreases reliability and increases cost. These devices are also designed as large area devices which again decreases yield and increases costs.

If polysilicon is utilized to decrease the number of interconnects, other problems occur since the polysilicon transistors are leaky. Therefore, typically these LCD devices utilize two transistors in series at each pixel, which again decreases reliability and increases costs.

Figure 2A:
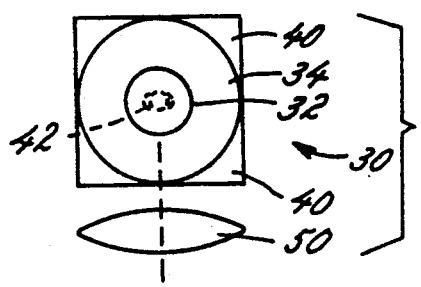
FIGS. 2A, 2B and 2C are diagrammatic top, front and side views of one reflective image plane module embodiment of the present invention.
Figure 2B:
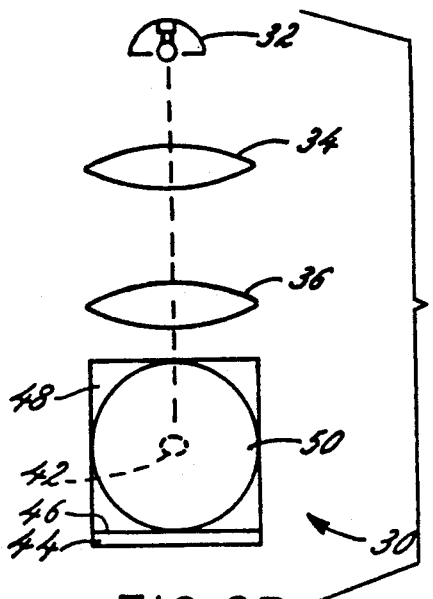
Figure 2C:
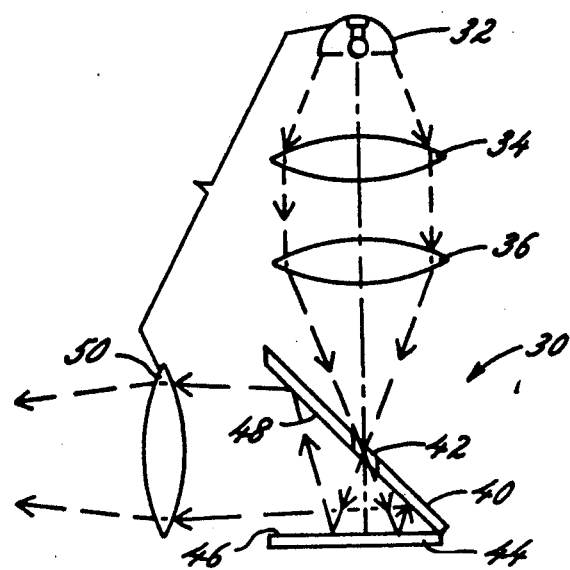

Referring to FIGS. 2A, 2B and 2C, top, front and side views of a first embodiment of a reflective image plane module of the present invention is designated generally by the reference character 30. A light source 32, such as a bulb and a reflector, provides a source of light. The light is columnated by a lens 34 and condensed or focused by a lens 36 to the reflective image plane module 30.

The reflective image plane module 30 includes a first mirrored wall 40 which has an aperture 42 through which the light passes and impinges on a back wall 44 of the reflective image plane module 30. The back wall 44 has attached thereto or is formed of a wafer based active matrix 46. The light has the information imparted to or encoded on it by the wafer based active matrix 46 as it is reflected from the wafer based active matrix 46. One specific example of the wafer based active matrix is further described in Ser. No. 392859, entitled "WAFER BASED ACTIVE MATRIX", filed concurrently herewith and incorporated herein by reference.

The wafer based active matrix 46 is a wafer based active matrix having a specular reflective back surface to reflect light therefrom. The wafer based active matrix is covered by an LCD or similar characteristic material, such as an electrophoretic material. One preferable LCD material is a solid light modulating material having bodies of LC material suspended therein. Examples of such LCD materials are described in U.S. Pat. Nos. 4,435,067 and 4,688,900, which are incorporated herein by reference. Other types of LC material also can be utilized, such as dyed phase change or guest-host material.

The light reflected from the wafer based active matrix 46 is reflected by a mirror back surface 48 of the wall 40. The reflected light is directed to a projection lens 50, which lens or lens system can be a fixed or zoom type lens. If utilized in a projector system, the reflected light is projected by the lens 50 to be viewed, typically on a screen (not illustrated). The reflective image plane module 30 as described can be utilized as a monochrome projection system or can be combined as will be described hereinafter to form a unit of a full color projection system. If utilized as a mask or portion of a mask system, the lens 50 will be utilized to focus the mask image onto a substrate (not illustrated).

The reflective image plane module 30 generally only includes the light directing and reflecting structures formed by the elements 40, 42, 44 (including the wafer based active matrix 46) and 48. The mirrored wall 40 preferably would be mounted to the back wall 44 in a fixed position, such as by posts not illustrated, and the angle between the two walls can be selected as desired. The reflective image plane module 30 can, however, include the light 32 and other light directing elements 34, 36 and 50, if desired. In general, the elements 32, 34, 36 and 50 would be selected by the end utilization of the reflective image plane module 30.

Figure 3A:
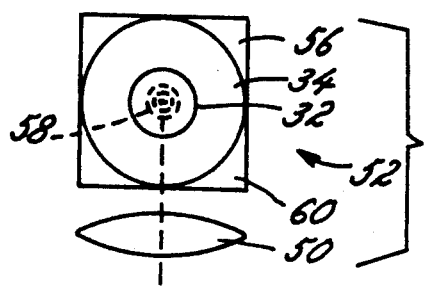
FIGS. 3A, 3B and 3C are diagrammatic top, front, and side views of a second reflective image plane module embodiment of the present invention.
Figure 3B:
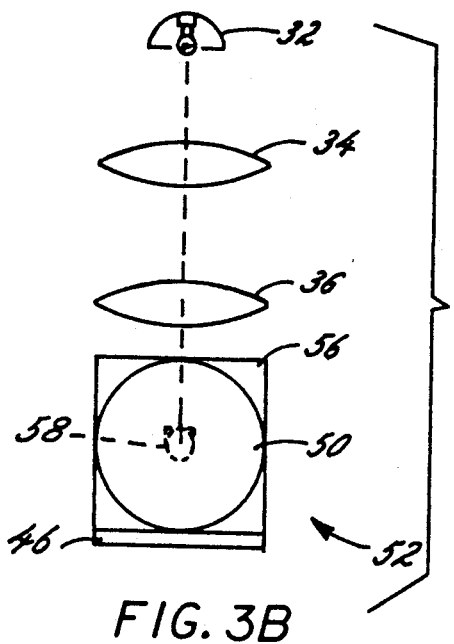
Figure 3C:
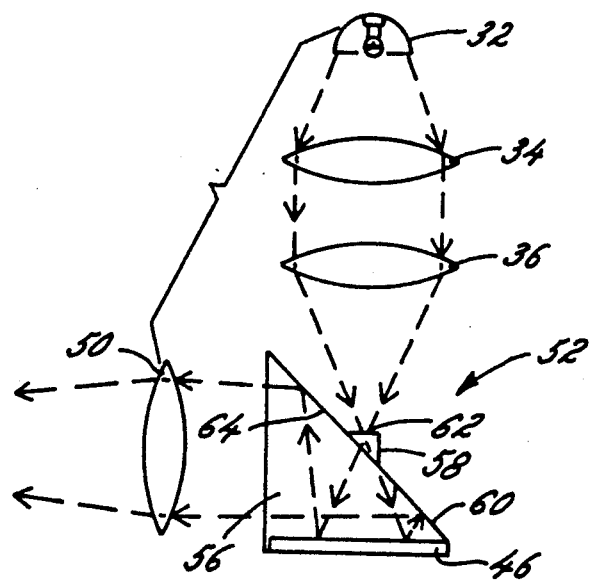

A second embodiment of a reflective image plane module of the present invention is best illustrated in FIGS. 3A-3C, designated generally by the reference character 52. The same or equivalent elements in this or succeeding embodiments will utilize the same numerals as previously described with respect to the reflective image plane module 30. The reflective image plane module 52 functions substantially the same as the reflective image plane module 30, as illustrated in FIG. 3C. The reflective image plane module 52 replaces the mirror 48 with a prism 56. The prism 56 includes a projection 58 formed in a first wall 60 thereof.

The projection 58 includes a light receiving surface 62, through which the light is focused. As before, the light is acted upon and reflected by the wafer based active matrix 46 and again reflected by an inside surface 64 of the wall 60 to the lens 50.

Figure 4A:
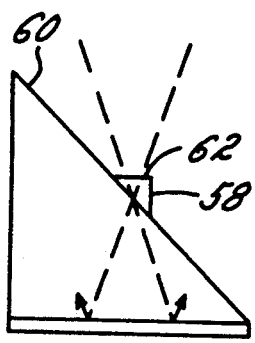
FIGS. 4A, 4B and 4C are partial diagrammatic side views of embodiments of projection surfaces for the reflective image plane module of FIGS. 3A-3C.
Figure 4B:
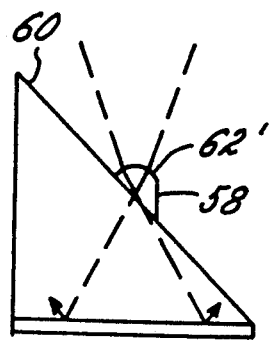
Figure 4C:
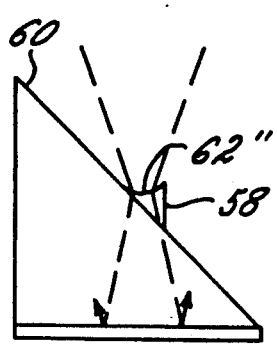

The projection 58 and the surface 62 form another optical element of the reflective image plane module 52. As illustrated in FIGS. 4A-4C, the surface 62 can be flat, can be a convex surface 62' or can be a concave surface 62" as desired. The shape of the surface 62 is chosen to widen, narrow and/or direct the light beam. Preferably, the reflective image plane module 52 is injection molded as an integral unit. Generally, the prism 56 and the wafer based active matrix 46 form the reflective image plane module 52.

Figure 5A:
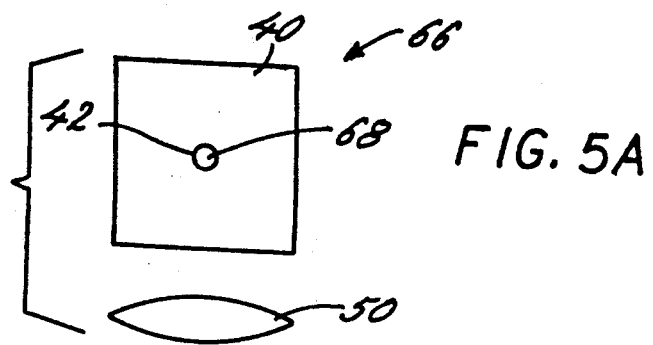
FIGS. 5A, 5B and 5C are diagrammatic top, front and side views of another reflective image plane module embodiment of the present invention.
Figure 5B:
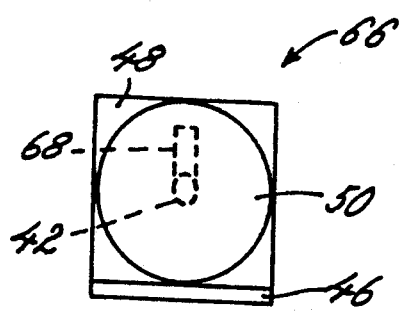
Figure 5C:
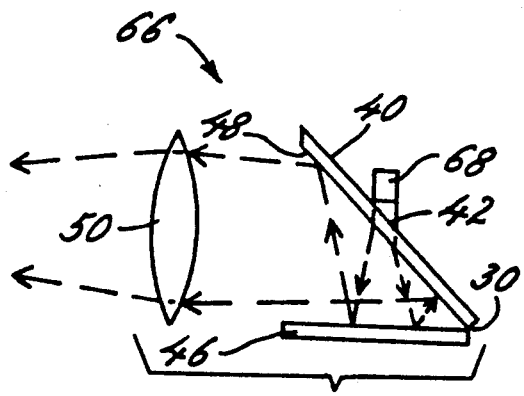

A third embodiment of a reflective image plane module of the present invention is best illustrated in FIGS. 5A-5C and is designated generally by the reference numeral 66. The focused light beam utilizing the lens 34 and 36 would collect the most light, but the lens system encompasses a fairly large amount of space. The reflective image plane module 66 provides a very compact unit by eliminating the lens 34 and 36. A light source 68, such as a bulb, is mounted directly into the aperture 42 of the wall 40 of the reflective image plane module 66, which otherwise operates the same as the reflective image plane module 30. The light is reflected from the wafer based active matrix 46 to the mirror surface 48 to the lens 50. This is not the most energy efficient embodiment and if utilized in a color system, the light from the bulb 68 would be passed through the appropriate filter to provide the red, green or blue color component. Again, the light 68 and the lens 50 generally would not form part of the reflective image plane module 66.

Figure 6A:
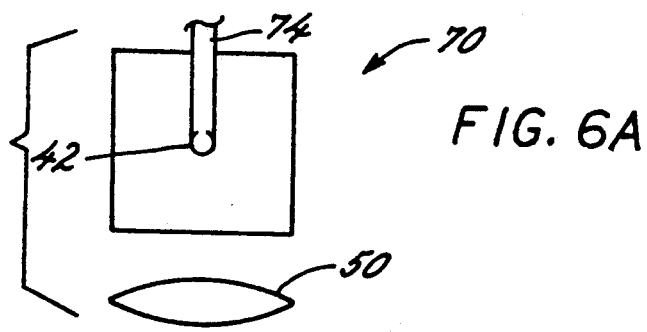
FIGS. 6A, 6B and 6C are diagrammatic top, front and side views of a further reflective image plane module embodiment of the present invention.
Figure 6B:
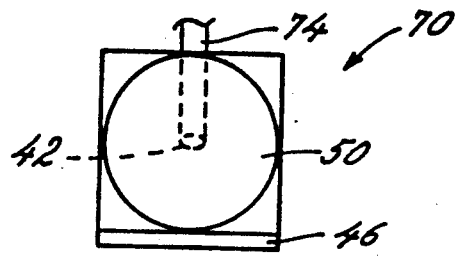
Figure 6C:
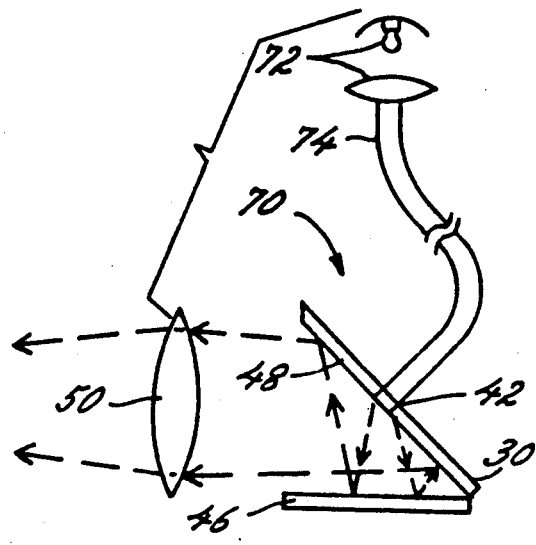

A further embodiment of a reflective image plane module of the present invention is best illustrated in FIGS. 6A-6C and is designated generally by the reference numeral 70. The reflective image plane module 70 is somewhat of a compromise between the reflective image plane modules 30 and 66. A light source 72 is coupled into a fiber optic light guide or tube 74, which directs the light into the reflective image plane module 70 through the aperture 42, where it is acted upon like the reflective image plane module 30. The guide 74 gathers more light than utilizing the bulb 68, but encompasses more space than the bulb 68. The light guide 74 is more flexible and occupies less space than the lens system 34, 36.

Figure 7A:
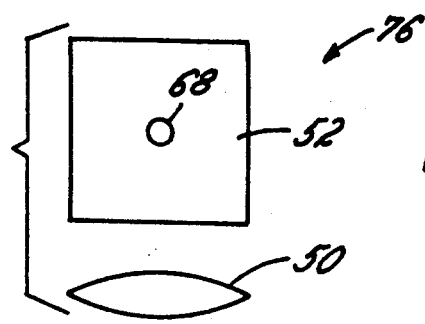
FIGS. 7A, 7B and 7C are diagrammatic top, front and side views of yet another reflective image plane module embodiment of the present invention.
Figure 7B:
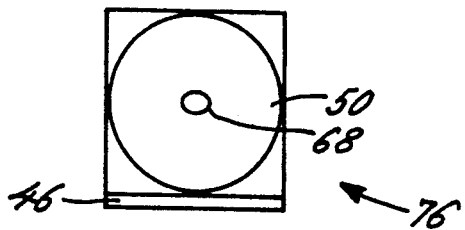
Figure 7C:
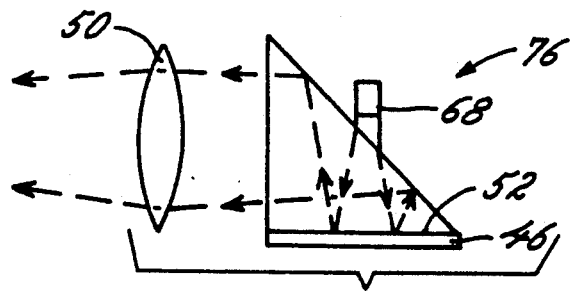

The bulb 68 can be utilized with the prism type reflective image plane module 52, as best illustrated in FIGS. 7A-7C, forming another reflective image plane module embodiment of the present invention which is designated generally by the reference numeral 76. The operation of the reflective image plane module 76 is generally the same as the reflective image plane module 52, once the light is introduced to the reflective image plane module 76.

Figure 8A:
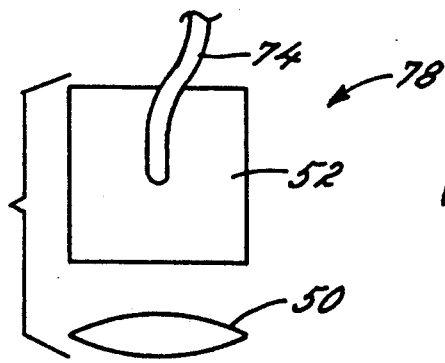
FIGS. 8A, 8B and 8C are diagrammatic top, front and side views of a still further reflective image plane module embodiment of the present invention.
Figure 8B:
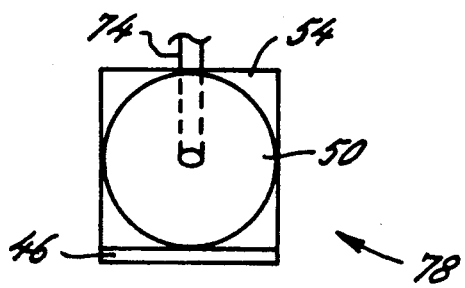
Figure 8C:
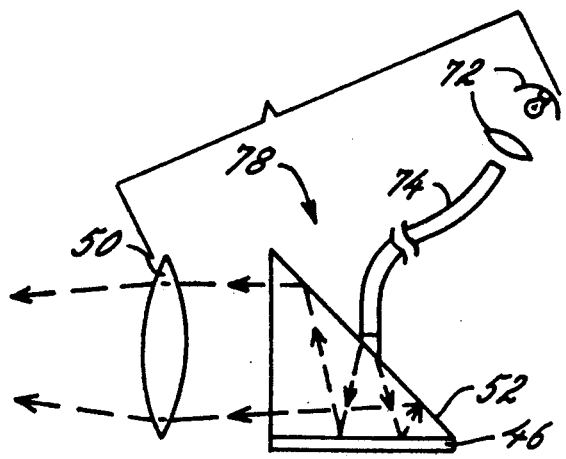

The light guide 74 also can be utilized with the prism type reflective image plane module 52, as best illustrated in FIGS. 8A-8C, forming a further reflective image plane module embodiment of the present invention which is designated generally by the reference numeral 78. Again, the operation of the reflective image plane module 78 is generally the same as the reflective image plane module 52, once the light is introduced to the reflective image plane module 78.

Figure 9:
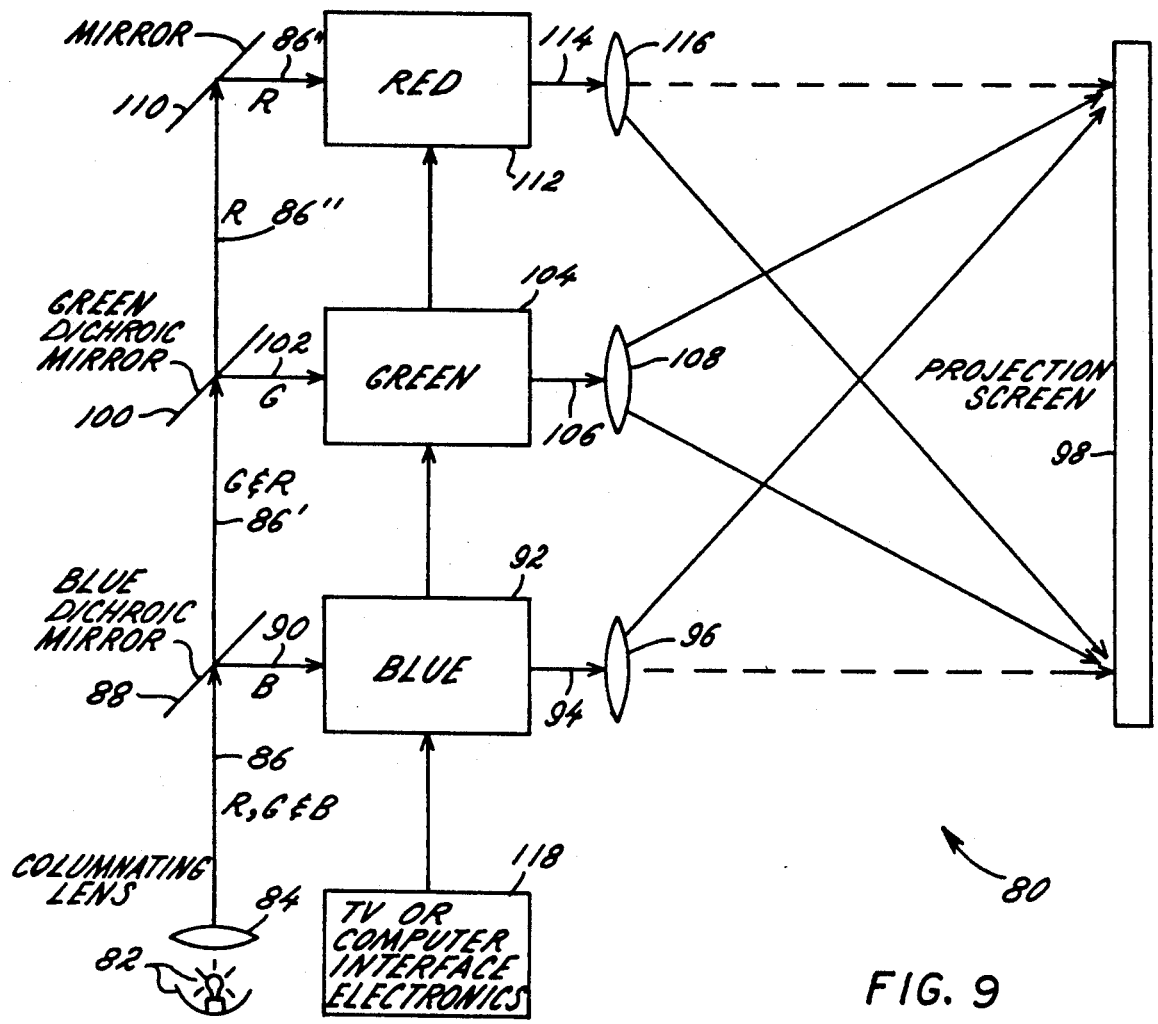
FIG. 9 is a diagrammatic side view of one projection system embodiment utilizing the reflective image plane modules of the present invention.

Each of the above reflective image plane modules can be utilized as part of a monochrome projection or imaging system or can form one reflective image plane module of a three lens color projection system embodiment of the present invention, for example, as illustrated in FIG. 9 and which is designated generally by the reference character 80. The projection system 80 and other projection systems are further described in Ser. No. 392746, entitled "AN ACTIVE MATRIX REFLECTIVE PROJECTION SYSTEM", filed concurrently herewith and incorporated herein by reference. The projection system 80 includes a light source 82, such as a bulb and reflector, from which light is directed through a columnating lens or lens system 84 to form a beam of light 86. The light beam 86 includes all three light components red, blue and green (hereinafter R, B and G).

The beam 86 is directed to a B dichroic mirror 88. The B light component 90 is reflected from the mirror 88 to a B reflective image plane module 92. The B reflective image plane module 92 can be any of the above-described reflective image plane modules 30, 52, 70 and 78. The encoded B light 94 is reflected from the B reflective image plane module 92 to a lens 96 and projected by the lens 96, to a screen 98, where it is combined with the other components to form a color image.

A light beam 86' passes through the mirror 88 with the G & R light components therein. The light beam 86' is directed to a G dichroic mirror 100. The G light component 102 is reflected from the mirror 100 to a G reflective image plane module 104. The encoded G light 106 is reflected from the G reflective image plane module 104 to a lens 108 and projected by the lens 108 to the screen 98.

A light beam 86" passes through the mirror 100 with only the R component therein. The beam 86" is directed to a mirror 110 and reflected therefrom to a R reflective image plane module 112. The encoded R light 114 is reflected from the R reflective image plane module 112 to a lens 116 and projected by the lens 116 to the screen 98. The information encoding is provided by an electronic interface 118 coupled to the reflective image plane modules 92, 104 and 112.

Figure 10:
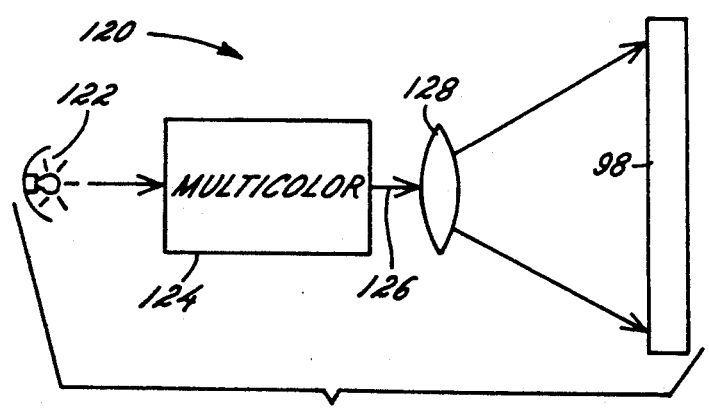
FIG. 10 is a diagrammatic side view of yet another projection system embodiment utilizing a reflective image plane module of the present invention.

Referring now to FIG. 10 an embodiment of a single imaging, single lens projection system of the present invention is best illustrated and is designated generally by the reference numeral 120. A light source 122, of any of the above referenced types, provides light to a multicolor reflective image plane module 124. A fully encoded light beam 126 is output from the color reflective image plane module 124 and focused by a lens 128 onto the screen 98. In this configuration, only one reflective image plane module is utilized with one wafer based active matrix; however, the wafer based active matrix includes a mosaic or other type of color filter array integral therewith. This configuration would not currently be the most desirable, because three monochrome reflective image plane modules would triple the resolution on the screen 98 and would triple the resolution on the screen 98 and would absorb much less heat than the single reflective image plane module 124.

Modifications and variations of the present invention are possible in light of the above teachings. The projection system light source could be any suitable type of light source, such as xenon metal halide or quartz-halogen lights for example. The projection systems have been described, for example purposes, as front screen projection systems, but also could be rear screen configurations or utilize fiber optic expanders, where the light is projected onto an end of a fiber optic brindle. The reflective image plane modules can be formed separately or can be formed integrally connected together to form a full color module. It is therefore to be understood that within the scope of the appended claims, the invention may be practiced otherwise than as specifically described.

What is claimed and desired to be secured by Letters Patent of the United States is:

1. A reflective image plane module, comprising:
   reflective imaging means including a wafer based active matrix for forming a reflected light beam from light directed thereto and for imparting information onto said reflected light beam;
   said wafer being a non light transmissive single crystal wafer substrate with said active matrix formed on one surface of said wafer; and
   means for projecting said reflected light beam for viewing.

2. The module as defined in claim 1 wherein said reflective imaging means include a mirror with an aperture therein to direct light through to said wafer based active matrix and said mirror forming at least a portion of said projecting means.

3. The module as defined in claim 2 wherein said projecting means further include projecting lens means.

4. The module as defined in claim 2 including a lens system for columnating light from a light source and focusing the light through said aperture.

5. The module as defined in claim 2 including a light source mounted into said aperture for directing light to said reflective imaging means.

6. The module as defined in claim 2 including fiber optic light guide means for coupling light from a lilght source to said aperture.

7. The module as defined in claim 1 wherein said reflective imaging means including a prism with a light receiving projection for directing light and said prism forming at least a portion of said projecting means.

8. The module as defined in claim 7 wherein said prism is a one-piece molded body with said projection molded into one wall of said prism and said wafer based active matrix is mounted on another wall of said prism.

9. The module as defined in claim 7 wherein said projecting means further include projecting lens means.

10. The module as defined in claim 7 including a lens system for columnating light from a light source and focusing the light through said projection.

11. The module as defined in claim 7 including a light source mounted onto said projection.

12. The module as defined in claim 7 including fiber optic light guide means for coupling light from a light source to said projection.

13. The module as defined in claim 7 wherein said projection has a light receiving surface shaped to direct the light.

14. The module as defined in claim 1 wherein said wafer based active matrix includes a color filter array for forming a reflected color light beam.

15. The module as defined in claim 1 wherein said reflective imaging means forms a portion of a projection system.

16. A reflective image plane module, comprising:
   reflective imaging means including a wafer based active matrix for forming a reflected light beam from light directed thereto and for imparting information onto said reflected light beam;
   said wafer being a non light transmissive single crystal wafer substrate with said active matrix formed on one surface of said wafer; and
   means for projecting said reflected light beam for viewing; and
   said reflective imaging means including a mirror with an aperture therein to direct light through to said wafer based active matrix and said mirror forming at least a portion of said projecting means.

17. The module as defined in claim 16 wherein said projecting means further include projecting lens means.

18. The module as defined in claim 16 including a lens system for columnating light from a light source and focusing the light through said aperture.

19. The module as defined in claim 16 including a light source mounted into said aperture for directing light to said reflective imaging means.

20. The module as defined in claim 16 including fiber otpic light guide means for coupling light from a light source to said aperture.

21. The module as defined in claim 16 wherein said wafer based active matrix includes a color filter array for forming a reflected color light beam.

22. A reflective image plane module, comprising:
   reflecting imaging means including a wafer based active matrix for forming a reflected light beam from light directed thereto and for imparting information onto said reflected light beam;
   means for projecting said reflected light beam for viewing; and
   said reflective imaging means including a prism with a light receiving projecting for directing light and said prism forming at least a portion of said projecting means.

23. The module as defined in claim 22 wherein said prism is a one-piece molded body with said projection molded into one wall of said prism and said wafer based active matrix is mounted on another wall of said prism.

24. The module as defined in claim 22 wherein said projecting means further include projecting lens means.

25. The module as defined in claim 22 including a lens system for columnating light from a light source and focusing the light through said projection.

26. The module as defined in claim 22 including a light source mounted onto said projection.

27. The module as defined in claim 22 including fiber optic light guide means for coupling light from a light source to said projection.

28. The module as defined in claim 22 wherein said projection has a light receiving surface shaped to direct the light.

29. The module as defined in claim 22 wherein said wafer based active matrix includes a color filter array for forming a reflected color light beam.

30. The module as defined in claim 1 including an LCD material formed on said active matrix, said LCD material formed from a solid light modulating material having bodies of LC material suspended therein.

31. The module as defined in claim 16 including an LCD material formed on said active matrix, said LCD material formed from a solid light modulating material having bodies of LC material suspended therein.

32. The module as defined in claim 22 including said wafer being a non light transmissive single crystal wafer substrate with said active matrix formed on one surface of said wafer.

33. The module as defined in claim 32 including an LCD material formed on said active matrix, said LCD material formed from a solid light modulating material having bodies of LC

* * * * *